United States Patent [19]

Tzou et al.

[11] Patent Number: 5,530,942

[45] Date of Patent: Jun. 25, 1996

[54] GRAPHIC AND TEXT INTERACTIVE USER INTERFACE FOR A PROGRAM EXECUTION ANALYZER

[75] Inventors: Sheu-Fang M. Tzou, Hurley; John W. Jacobson, Saugerties, both of N.Y.

[73] Assignee: International Business Machines Corporation, Armonk, N.Y.

[21] Appl. No.: 387,362

[22] Filed: Feb. 13, 1995

Related U.S. Application Data

[63] Continuation of Ser. No. 9,509, Jan. 27, 1993, abandoned.

[51] Int. Cl.[6] .................................................. G06F 15/00
[52] U.S. Cl. .......................................... 395/147; 395/161
[58] Field of Search .................................. 395/147, 153, 395/160, 161; 364/578, 579; 345/116

[56] References Cited

U.S. PATENT DOCUMENTS

| | | | |
|---|---|---|---|
| 4,034,353 | 7/1977 | Denny et al. | 364/200 |
| 4,833,606 | 5/1989 | Iwasawa et al. | 364/300 |
| 4,860,204 | 8/1989 | Gendron et al. | 364/300 |
| 4,943,968 | 7/1990 | Hirose et al. | 371/19 |
| 4,951,195 | 8/1990 | Fogg, Jr. et al. | 364/200 |
| 4,970,664 | 11/1990 | Kaiser et al. | 395/160 |
| 5,047,919 | 9/1991 | Sterling et al. | 364/200 |
| 5,062,055 | 10/1991 | Chinnaswamy et al. | 364/513 |
| 5,097,428 | 3/1992 | Crosby | 364/554 |
| 5,103,394 | 4/1992 | Blasciak | 395/575 |
| 5,107,418 | 4/1992 | Cramer et al. | 395/700 |
| 5,168,554 | 12/1992 | Luke | 395/147 |
| 5,168,563 | 12/1992 | Shenoy et al. | 364/578 |
| 5,251,159 | 10/1993 | Rowson | 364/578 |

OTHER PUBLICATIONS

Eick et al., "Visualizing Code Profiling Line Oriented Statistics", IEEE (1992), pp. 210–217.
Eick et al., "Seesoft—A Tool for Visualizing Line Oriented Software Statistics", IEEE Transactions on Software Engineering, vol. 18, No. 11 Nov. 1992.
Stewart, "Development Tools", Computer Shopper, (Jun. 1992), pp. 702, 704, and 706.
Methuin, "Profilers Pinpoint Program Bottlenecks", PC Week Reviews (Nov. 4, 1991), pp. 117–119, 123, and 124.
Szelenyi et al., "Visualizing Parallel Execution of FORTRAN Programs", IBM J. Res. Develop., vol. 35 No. 1/2 (Jan./Mar. 1991) pp. 270–282.
Shaw, "Multiscope–The OS/2 Debugger that PM Forgot?", PC Magazine (Oct. 31, 1989), pp. 33–34.
Dlugosz, "DOS Profilers", Computer Language, vol. 6, No. 10 (Oct. 1989), pp. 81–84.

(List continued on next page.)

Primary Examiner—Mark K. Zimmerman
Assistant Examiner—Joseph R. Burwell
Attorney, Agent, or Firm—Michaelson & Wallace; Floyd A. Gonzalez

[57] ABSTRACT

An interactive user interface system and method that creates graphic and text displays of computer program execution analysis results that include CPU execution time in tick or frequency counts. The interface system utilizes a display monitor (120), a mouse (130), which enables a user to input display commands, and a computer system (110) that is connected to the monitor (120) and the mouse (120). The computer system includes analysis results (165) and a user interface routine (170); the latter for displaying a plurality of, e.g., four windows (201, 280, 290, 291) on the monitor. The first and second windows (201, 290) have both text displays (214, 292) for displaying an annotated summary report (166), an annotated source listing (167) and an annotated assembly listing (168), and graphics displays (213, 298) for displaying graphs (256, 266, 294) of the counts. The third and fourth windows (280, 291) are displayed under user control to list file names corresponding to the annotated listings in the text displays. The text and graphics displays and windows are highlighted (270, 275, 286, 297, 296, 299) to accent high counts and the present display locations. The user can manipulate the displayed information, via the mouse, to investigate selected areas thereof in detail.

12 Claims, 15 Drawing Sheets

OTHER PUBLICATIONS

"Microsoft Windows User's Guide for the Graphical Windows Environment Version 3.0", Microsoft Corp. (1990), pp. 125–128.

Tuchman et al., "Run–time Visualization of Program Data", IEEE Visualization '91 Conference (1991), pp. 225–261.

Purtilo et al., "Purse–Tree Annotations", Communications of the ACM, vol. 32, No. 12 (Dec. 1989), pp. 1467–1477.

"IDT Announces New Tools, Moclules, Prices", Microprocessor Report, vol. 4 No. 14 (Aug. 22, 1990), pp. 4–5.

Spicer, "Object–Oriented C That Goes VROOMM", BYTE, (Oct. 1990), pp. 186–188.

Geary, "An Introduction to Microsoft Windows Version 3.0: A Developer's Viewpoint", Microsoft Systems Journal, vol. 5 No. 4 (Jul. 1990), pp. 1–28.

Wang et al., "Software Performance Analysis Using a Graphic Modeling Technique", 8th Annual International Phoenix Conference on Computers and Communications (1989) pp. 332–336.

Kilpatrick et al., "Using Languages for Capture, Analysis, and Display of Performance Information for Parallel and Distributed Applications", International Conference on Computer Languages (1990), pp. 180–189.

Gilles et al., "A Guided Tour Through a Window Oriented Debugging Environment for Embedded Real Time Ada Systems", 3rd International IEEE Conference on Ada Applications and Environments (1988), pp. 93–103.

GRAPHIC AND TEXT INTERACTIVE USER INTERFACE FOR A PROGRAM EXECUTION ANALYZER

CROSS REFERENCE TO RELATED APPLICATION

This application is a continuation of our patent application entitled "Graphic and Text Interactive User Interface For A Program Execution Analyzer" filed on Jan. 27, 1993 as U.S. Ser. No. 08/009,509, abandoned.

BACKGROUND OF THE INVENTION

1. Field of the Invention

The invention relates to computer program execution analysis systems and methods. More particularly, the invention relates to systems and methods for creating graphics and text displays of results yielded by a computer program execution analyzer.

2. Description of the Prior Art

In order to improve performance of code generated by various families of computers, it is often necessary to determine where large time periods are being spent by a given processor in executing code; such efforts are commonly known in the computer processing arts as locating "hot-spots." For instance, an application program usually consists of many source files and subroutines most of which will require different processing times. When tuning the code of an application program for optimal performance, a programmer often runs an execution-analysis tool to determine the most frequently executed or most time-consuming instructions in the code. The programmer then concentrates on tuning those areas that have the most effect on decreasing execution time. Also, execution-analysis tools are often necessary when porting code from one computer system to another. In practice, it is often critical to re-tune ported codes inasmuch as processing times and "hot-spots" usually differ from system to system-for the same program.

Various execution-analysis tools are disclosed in the following U.S. Pat. Nos. 5,103,394 (issued to Blasciak on Apr. 7, 1992); 5,047,919 (issued to Sterling et al. on Sep. 10, 1991); 4,943,968 (issued to Hirose et al. on Jul. 24, 1990); and 4,034,353 (issued to Denny et al. on Jul. 5, 1977. In addition, these patents illustrate various aspects of software execution that are measured and analyzed.

Basically, most execution-analysis tools identify those sections of an application program which consume the most CPU (e.g. a main processor) time. This function is frequently referred to as "profiling". CPU time may be determined in a number of ways. For instance, CPU time may be estimated by counting a number of times that a statement was executed. The total count in this instance, often referred to as a frequency count, will often be a very large number. A less ambitious profiling technique is to determine relative CPU time. In this instance, not all statement executions are counted. Specifically, statement executions are counted only at predetermined intervals, e.g., every one-hundredth of a second. Each count is called a tick. The CPU information or analysis profile, given in tick or frequency counts, may be provided at the source statement and/or assembly instruction levels.

Current program execution analyzers produce results that are usually organized into many output files. Typically, there will be at least one such output file for each source file. Each such routine or program module may have its own source file. Consequently, to locate a "hot-spot", a programmer must spend considerable time culling through each and every output file to: (a) appreciate the CPU time required in executing each subroutine or module relative to that required by the entire program and (b) with that appreciation in mind, locate a "hot-spot".

Because the data, typically referred to as "profile" results, provided in each output file is often in the form of a table of numbers, the programmer faces a tedious, burdensome and often confusing task of simultaneously visualizing relative performance data for more than a small number, e.g., two or three, source files and comparing the results. Consequently, in an application program that extends over a relatively large number of source files, locating a hot-spot can simply be too daunting to be practically accomplished by even an experienced programmer.

Thus, a need exists in the art for improved systems and methods that can afford a user the ability to quickly access, easily review and understand profile results, particularly for programs that extend over a large number of source files.

SUMMARY OF THE INVENTION

Advantageously, our present invention provides a graphical user interface tool for a use in conjunction with a program execution analyzer.

In that regard, an object of our invention is to provide a text and graphical user interface that displays profile results from a program execution analyzer in such manner as to allow a programmer to quickly and accurately review the results.

Another object of the invention is to provide a programmer, through such an interface, with an easy and fast way to manipulate data resulting from a program execution analyzer.

A further object is to enable a programmer, through such an interface, to quickly identify "hot-spots" from profile results, and to quickly navigate through these results.

These and other objects are achieved in accordance with our present invention by providing a user interface that creates graphic and text displays of analysis results. The interface comprises a display monitor, a display control that enables a user to input display commands, and a computer system that is connected to the monitor and the display control. The computer system includes a data base of analysis results and a user interface routine that displays on the monitor a text area, a graphics area and a selection area. The user interface routine also accesses the results and writes selected portions of the results in the text area, graphically depicts these results in the graphics area and displays selection items in the selection area.

More specifically, the present invention utilizes a display monitor, a display control for enabling a user to input display commands and a computer system. The system is connected to the monitor and the display control has a storage device for storing computer program analysis results and executes a user interface routine. This routine provides a window display routine for selectively displaying a plurality of windows on the monitor. Each window has a text area. At least two of the windows have a graphics area. A data display routine is provided for accessing the results and writing selected portions thereof in selected text areas and graphically depicting the results in selected graphics areas.

Another aspect of the invention includes a user interface method for creating interactive graphic and text displays of analysis results comprising the steps of storing the analysis results in a computer system; creating a monitor display having a text area, a graphics area and a selection area; accessing the results to create a display data base; writing selected portions of the results in the text area in accordance with the display data base; drawing graphics of the results in the graphics area in accordance with the display data base; and displaying selection items in the selection area.

Advantageously, our inventive tool executes independently of a program execution analyzer. As such, our tool can be executed remotely from a CPU and display information on a local workstation, while the CPU separately executes the program execution analyzer.

BRIEF DESCRIPTION OF THE DRAWINGS

The teachings of the present invention can be readily understood by considering the following detailed description in conjunction with the accompanying drawings, in which:

FIGS. 2C–2I are diagrams showing a monitor screen containing Detail-mode displays in accordance with our present invention;

To facilitate reader understanding, identical reference numerals have been used, where possible, to denote various elements that are common to the figures.

DETAILED DESCRIPTION OF THE PREFERRED EMBODIMENT

Figure 1:
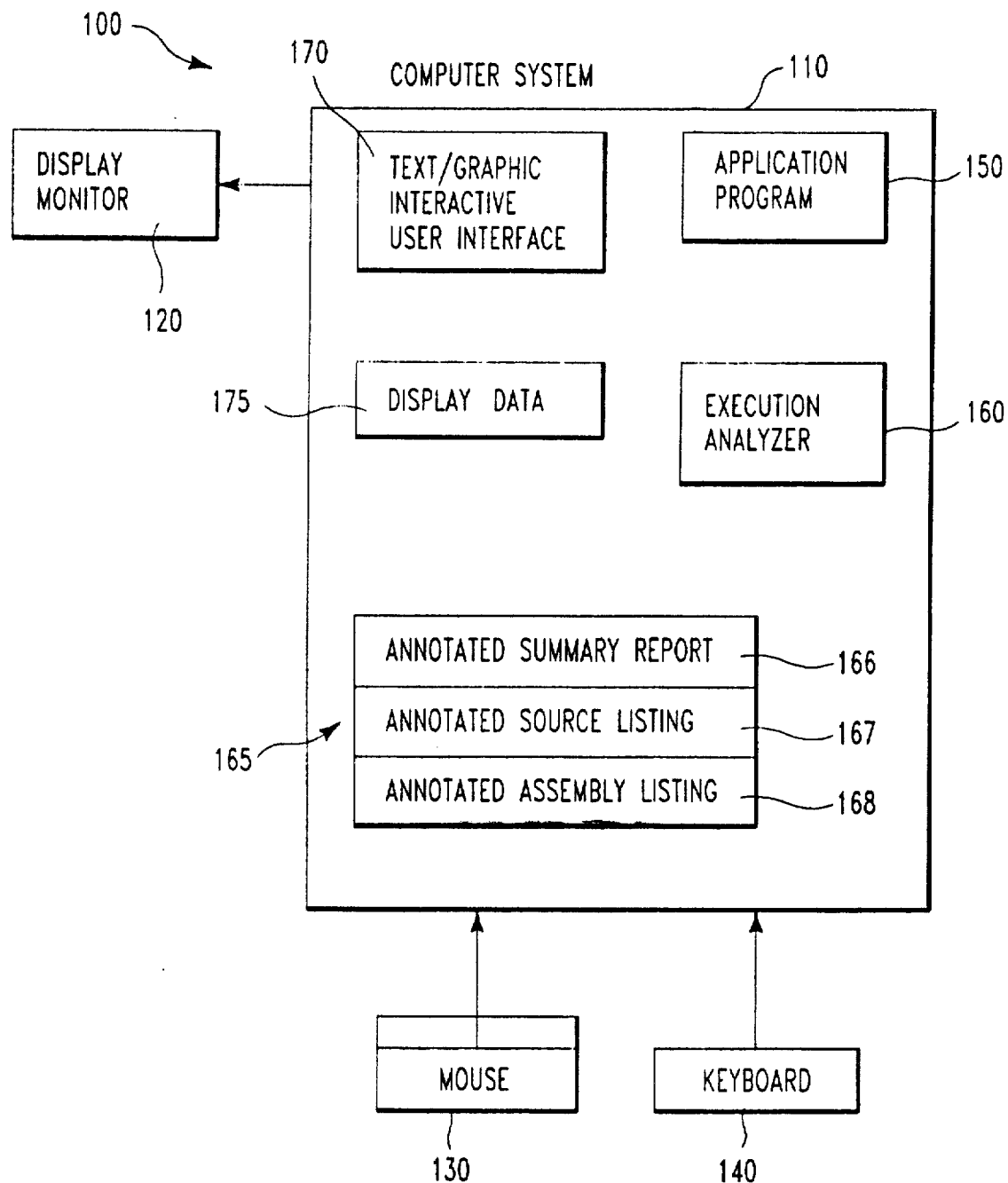
FIG. 1 is a high-level block diagram of a preferred embodiment of a system that implements our present invention.

Referring now to the drawings, FIG. 1 shows data processing system 100 having computer 110 with the following peripherals: display monitor 120; an interactive control input device, which is illustratively shown as mouse 130; and a second input device, which is illustratively shown as keyboard 140. Resident in computer 110, and specifically within a memory therein (not specifically shown but well-known) are the following: application program 150; execution analyzer 160 with its results 165; and text/graphic interactive user interface 170 with its results, viz. display data 175. Results 165, which collectively form a database, illustratively comprise annotated summary report 166, annotated source listing 167, and annotated assembly listing 168.

Data processing system 100 operates in the following manner: application program 150 and execution analyzer 160 are run as the result of commands provided by a user via keyboard 140. While program 150 is running, execution analyzer 160 observes CPU execution times and generates results 165 for this particular application program; these results constitute an execution profile of program 150 with respect to computer 110. To analyze these results, the user runs text/graphic interface 170 via keyboard 140. Interface 170 generates display data 175 by formatting, classifying, sorting and otherwise arranging results 165, and by calculating graphical data. Display data 175 is interactively accessed by the user via interface 170, mouse 130 and monitor 120. Execution analyzer 160 is preferably an "TPROF" software profiling tool developed by the present assignee. This particular tool is fully described in a co-pending United States patent application entitled "System and Method for Computer System Profiling", Ser. No. 07/662,521 filed Feb. 28, 1991, assigned to the present assignee hereof and which is incorporated by reference herein. While our invention can be advantageously utilized in conjunction with any of a wide variety of program analyzers, each of these analyzers, for compatibility with our preferred embodiment, should produce its result in a form of separate annotated summary listing, annotated source listing and annotated assembly listing such as those provided by the "TPROF" tool.

FIGS. 2A–2I show a number of different displays that may be brought to screen 200 of monitor 120 under user control via mouse 130. To enhance understanding, the reader should simultaneously refer to these figures throughout the following discussions.

Figure 2A:
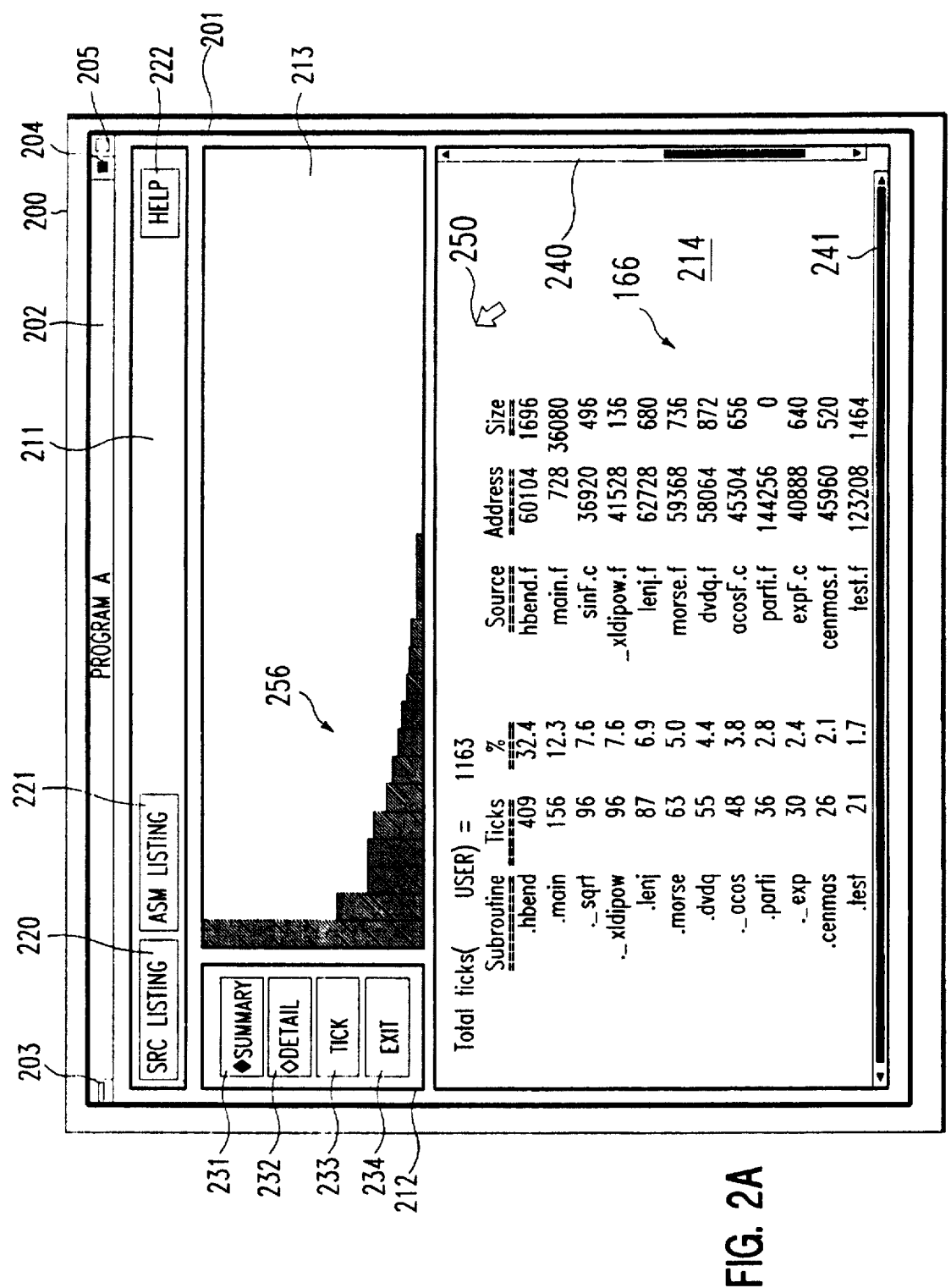
FIG. 2A is a diagram showing a monitor screen containing a Summary-mode display in accordance with our present invention.
Figure 2B:
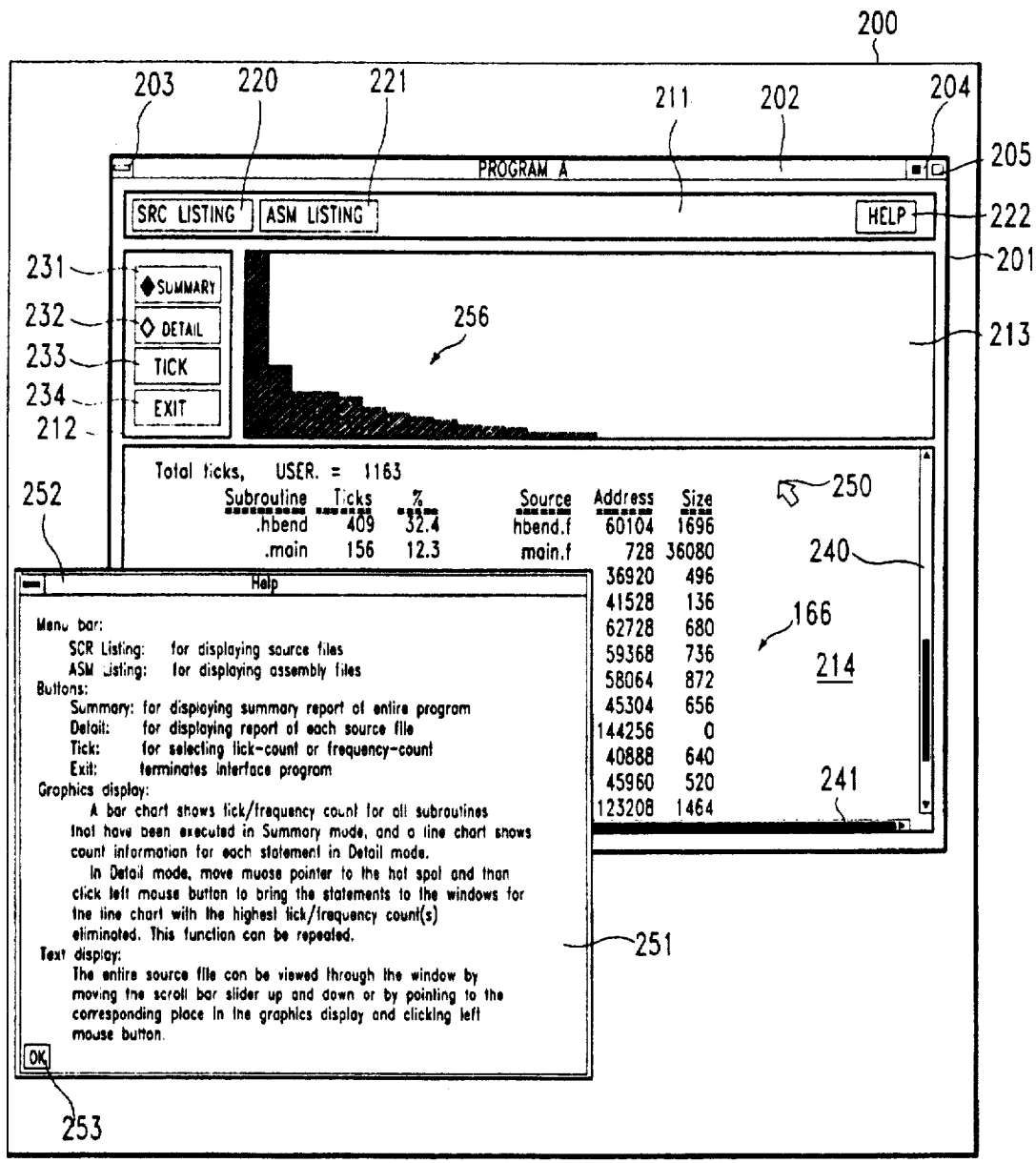
FIG. 2B is a diagram showing a monitor screen containing a HELP-mode display in accordance with our present invention.

FIG. 2A shows main window 201 that includes title bar 202 having three conventional window buttons, viz., window menu button 203, maximize button 205 and iconize button 204. The use of these buttons is well known and will, therefore, not be described in further detail.

Main window 201 displays the following items: menu bar 211, control button area 212, graphics display 213 and text display 214. Menu bar 211 includes three buttons for making menu selections, viz., SRC (source) LISTING button 220, ASM (assembly) LISTING button 221 and HELP button 222. Control button area 212 includes SUMMARY button 231, DETAIL button 232, TICK button 233 and EXIT button 234. Buttons 231 and 232 each include a diamond-shaped indicator on the face thereof.

Text display 214 includes conventional vertical and horizontal scroll bars 240 and 241, respectively. Scroll bars 240 and 241 include scroll boxes the size of which indicates how much information is currently being displayed relative to a total amount then available for display on the display screen at any one time. In this regard, a vertical scroll box approximately equal to one-third of the length of the scroll bar would indicate that approximately three screens of information exist in a vertical direction, and similarly for the horizontal scroll box. Mouse pointer 250 is shown in text display 214.

HELP button 222 is selected by clicking a left mouse button (not explicitly labeled) on mouse 130 while mouse pointer 250 is positioned on HELP button 222. When HELP button 222 is selected, help window 251 is displayed on screen 200 in the manner shown in FIG. 2B. Help window 251 may be brought to screen 200 at any time by selecting HELP button 222. Help display 251 describes the purpose of selectable buttons 220, 221, 231–234, the meaning of information shown on graphics display 213 and text display 214, and methods of accessing information via mouse 130. Help window 251 has title bar 252 with a menu button. "OK" button 253 is also included for the user to remove help window 251 from screen 200.

The initial default selection of interface 170 is the Summary-mode. The Summary-mode may also be entered by selecting SUMMARY button 231. In Summary-mode, the diamond-shaped indicator on SUMMARY button 231 is highlighted. FIG. 2A illustrates main window 201 as it appears while in the Summary-mode.

In Summary-mode, annotated summary report 166 is displayed in six columns within text display 214. The first column, from the left, is a listing of subroutines that form application program 150. For illustrative purposes, all source statements in application program 150 are assumed to be part of at least one subroutine. In summary report 166, the subroutines are sorted according to the number of ticks with the subroutine having the highest tick count (i.e., 409 ticks) listed first. Tick count is shown in the second column. The third column shows the relative tick count as a percent of total ticks. The last three columns respectively list the names of the corresponding source files in which the subroutines are located, the addresses of the source files and the file (sizes in number of bytes).

Also in Summary-mode, graphics display 213 displays bar graph 256 which graphically shows the relative number of ticks associated with all subroutines in summary report 166. Each bar in graph 256 represents a subroutine in the order that the subroutines is listed in report 166. The bar heights are proportional to the corresponding percentages shown in the third column of report 166. Whenever the number of subroutines in report 166 exceeds a pre-defined maximum number for depicting a meaningful bar graph, a line graph is drawn instead. Simply by glancing at bar graph 256 without looking at the number of ticks for each subroutine in the text, a user can quickly determine the number and relative location, within the listing of source subroutines, of the "hot" subroutines. Scroll bars 240 and 241 may be used to move parts of the text into view whenever all the currently available information will not fit into display 214.

To locate "hot-spots" when tuning program 150, the user must look at the "hot" subroutines in detail. This is done in the Detail-mode which is entered by selecting DETAIL button 232. Button 232 is selected by clicking the left mouse button while pointer 250 is positioned over this particular button. Selecting button 232 will cause SUMMARY button 231 to be un-selected. Also, the diamond-shaped indicator on button 232 will now be highlighted to show that the user is in the Detail-mode; the highlight on button 231 will then be removed.

Before entering the Detail-mode, the user may use pointer 250 to select a particular subroutine on summary report 166 for viewing while in the Detail-mode. If, however, a subroutine selection is not made and DETAIL button 232 is selected, the first file on report 166, i.e., the file with the most ticks, is brought to main window 201.

Figure 2C:
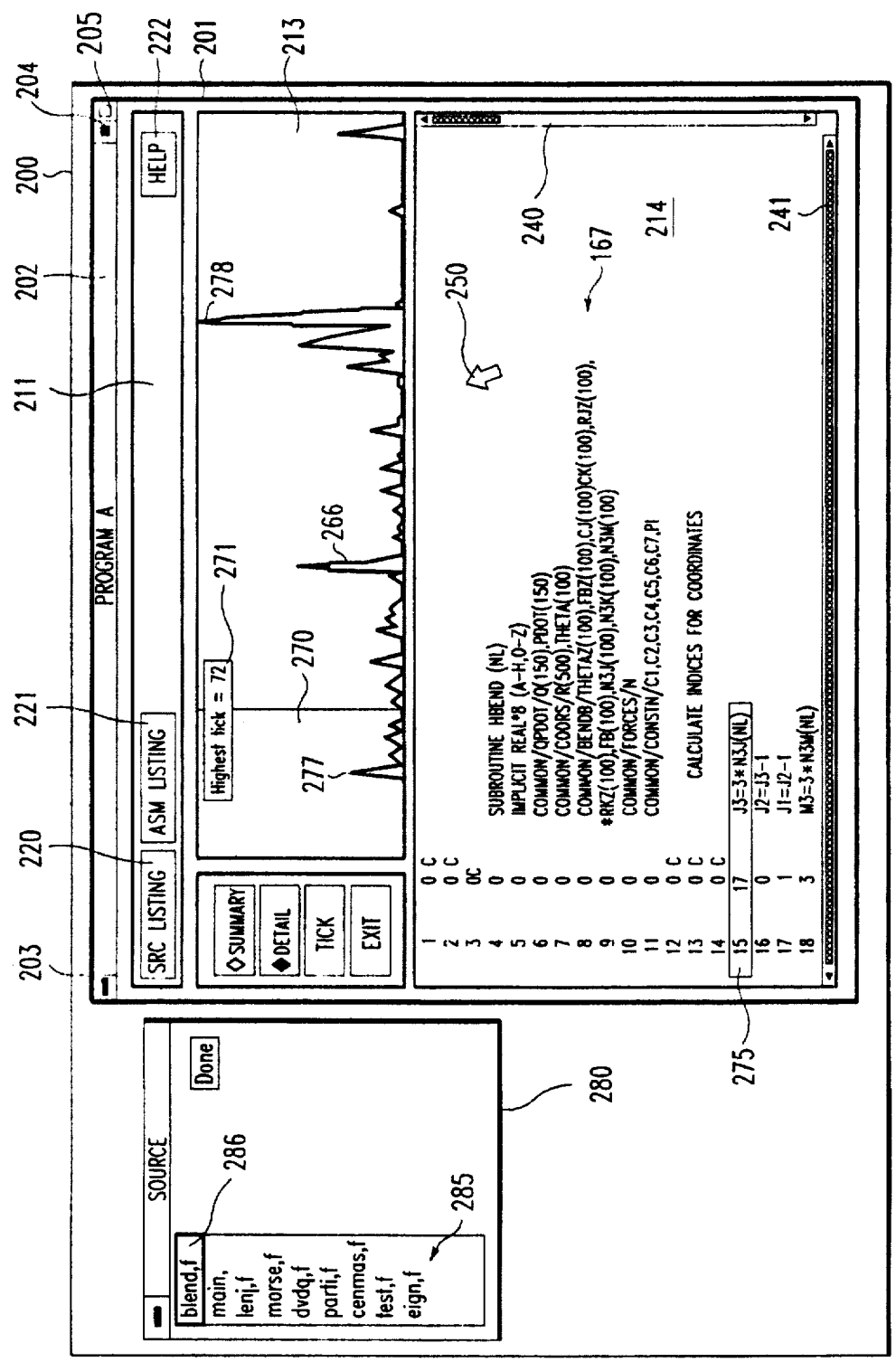

FIG. 2C shows screen 200 which displays main window 201 while in the Detail-mode. This particular figure shows line graph 266 in graphics display 213. Graph 266 displays the relative tick information for all statements in annotated source listing 167, part of which is displayed in text display 214. In annotated source listing 167, the first column from the left shows the line numbers while the second column shows the tick counts for the listed source statements.

Moveable rectangular graphics highlighter 270 is located in graphics display 213. The location of the highlighter corresponds to a current position in the source listing 167 which the user is currently examining. The width of highlighter 270 indicates that portion of line graph 266 that corresponds to the source statements of source listing 167 that is presently shown in display 214.

Indicator box 271 is also located in graphics display 213 to show the highest tick count in the entire file. Text highlighter 275 highlights that statement in display 214 with the highest tick count. For the example shown in FIG. 2C, the highlighted source statement on line #15 has 17 ticks and relates to peak 277 in line graph 266. According to box 271, the statement with the highest tick count in the entire file has 72 ticks. Peak 278, on line graph 266, indicates the location and relative tick-count size of the statement with the 72 ticks.

Also in the Detail-mode, screen 200 displays secondary window 280 that includes source file list 285. Highlighter 286 accents the file name that corresponds to the source statements in main window 201. Highlighter 286 may be moved by the user, via pointer 250, to bring the source statements of the other listed files to display 214.

Figure 2D:
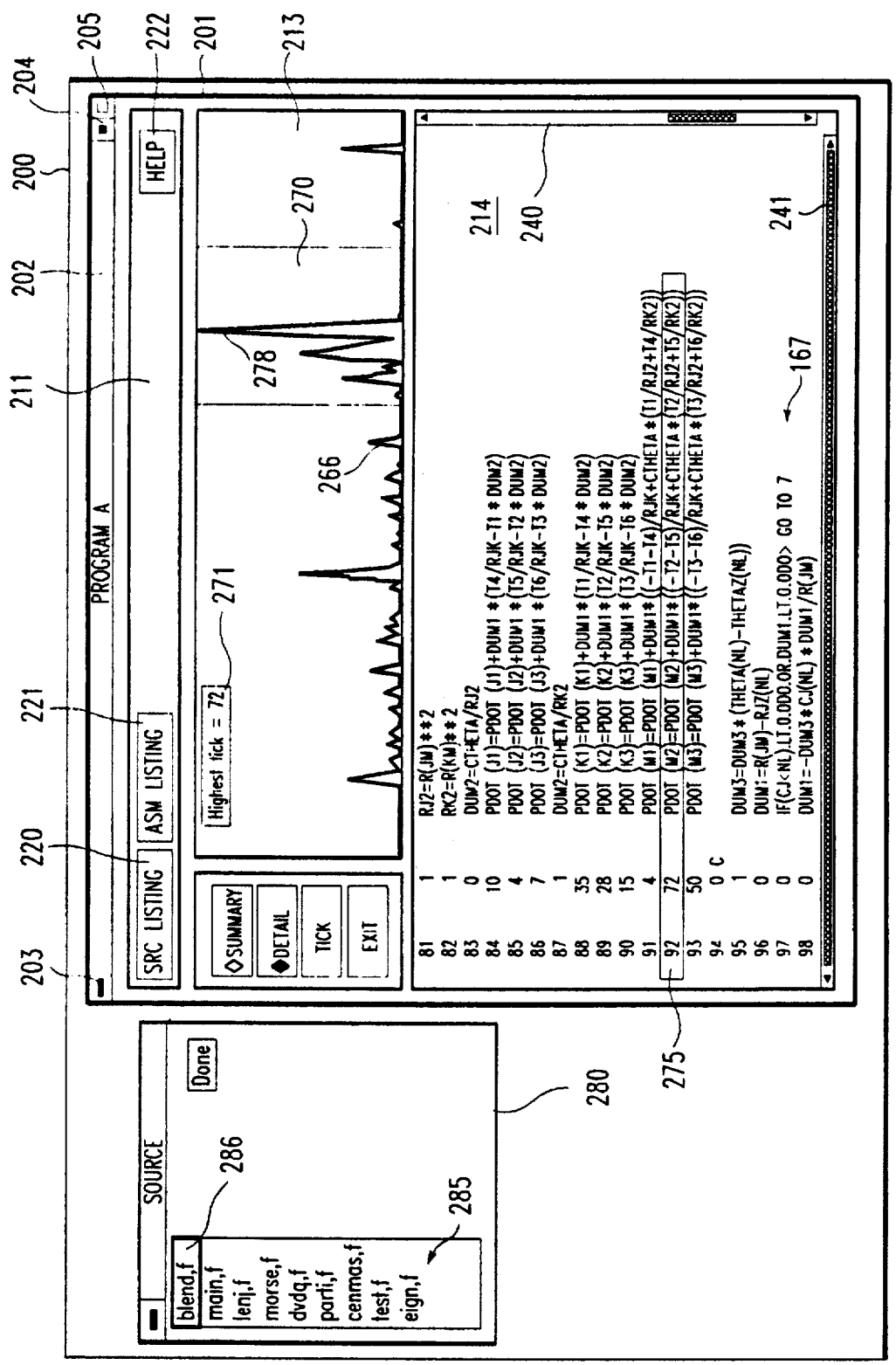

As shown in FIG. 2D, the user may bring the source statement that corresponds to peak 278 to text display 214 by clicking mouse 130 while pointer 250 is located on peak 278. In response to this action, highlighter 270 will move to peak 278 and the corresponding source statement on line #92 will move to display 214 and be accented by text highlighter 275.

Figure 2E:
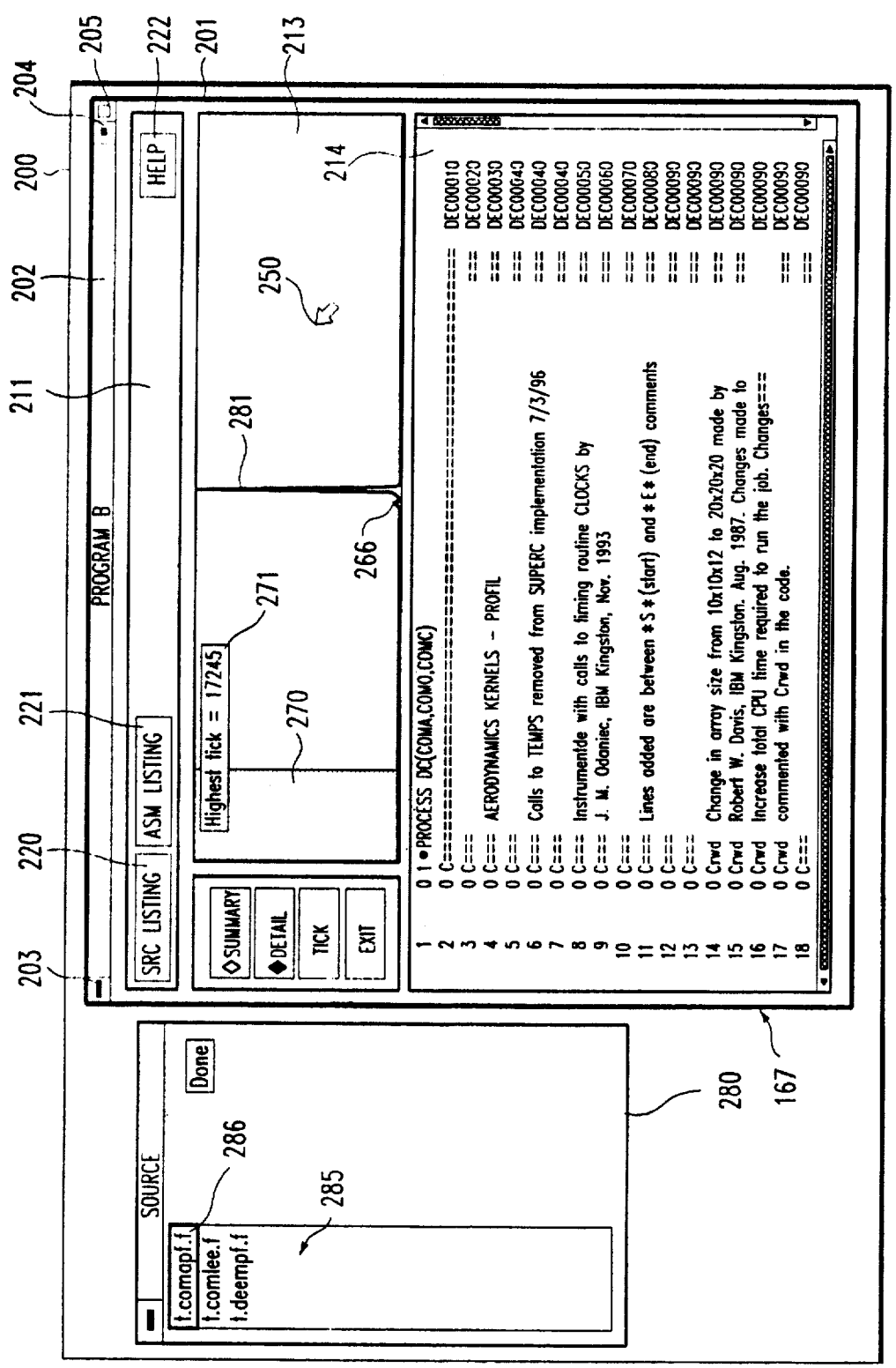
Figure 2F:
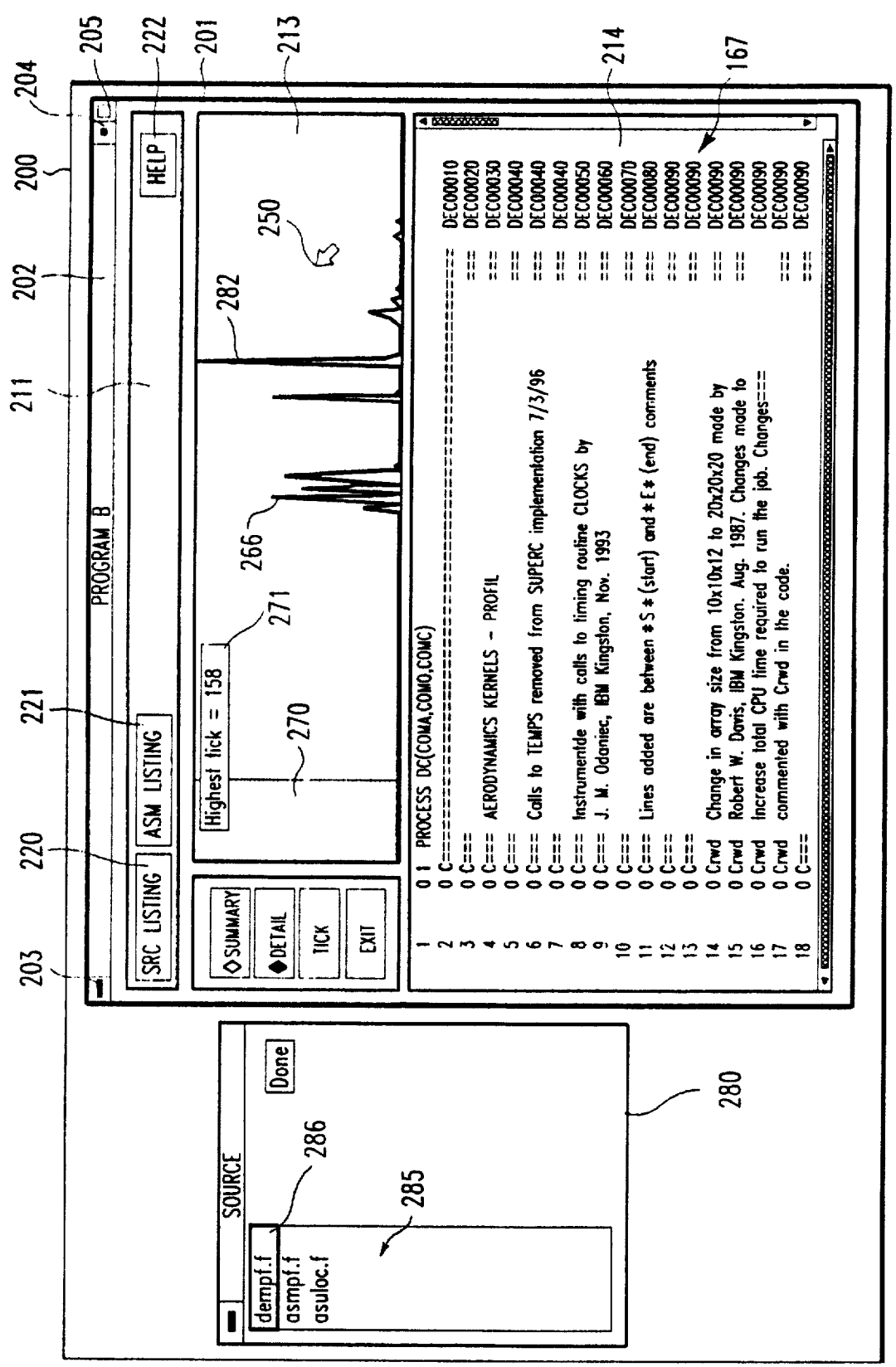
Figure 2G:
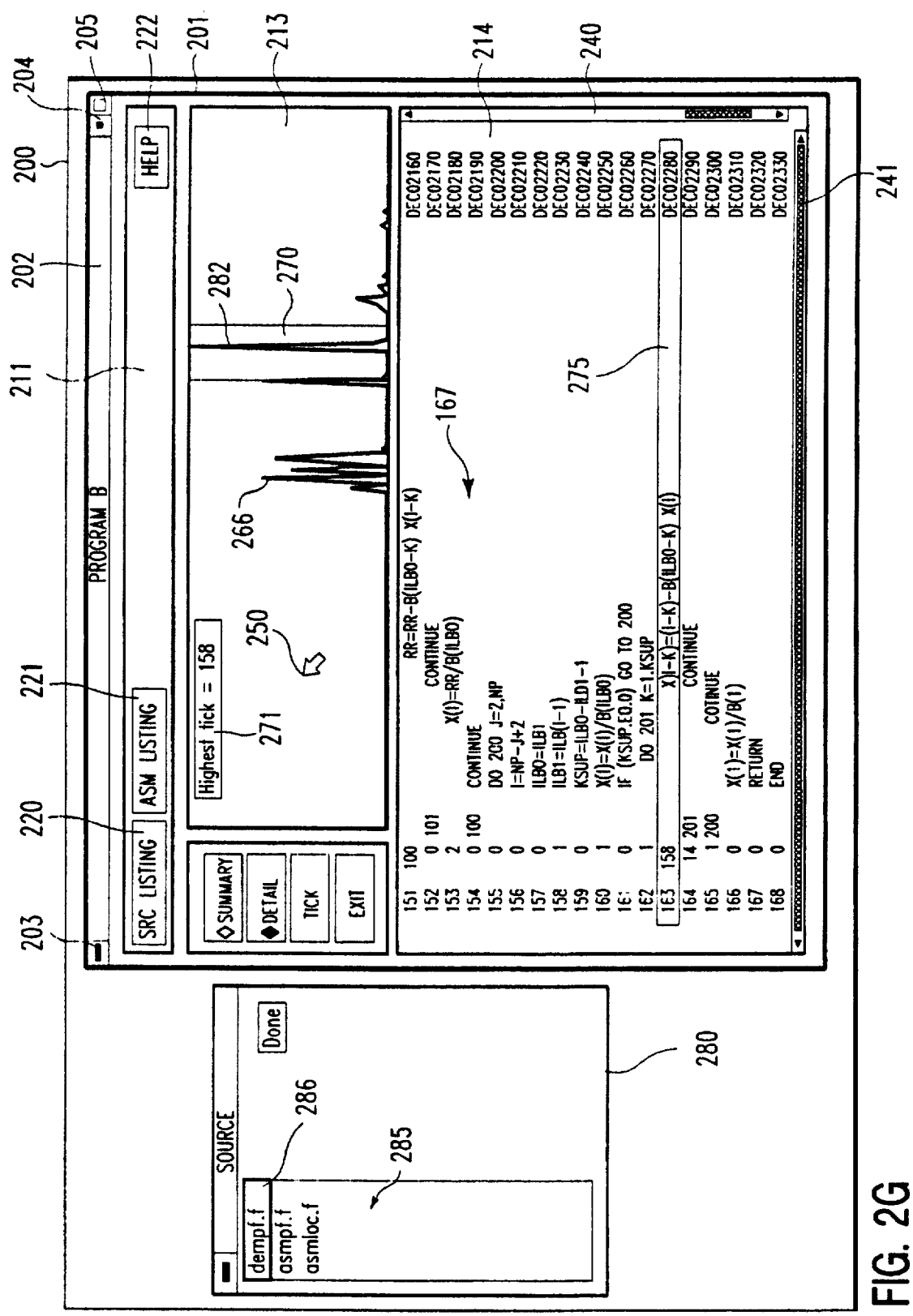

Furthermore, in the Detail-mode and as illustrated in FIGS. 2E–2G, the user can manipulate the information in graphics display 213 to find low-level "hot-spots." FIG. 2E shows main window 201 and secondary window 280 in Detail-mode. Title bar 202 indicates that execution results of analysis Program B are being displayed while list 285 in secondary window 280 shows the names of the three source files that constitute Program B. Highlighter 286 accents the name of the source file that corresponds to the source statements in display 214. Graphics display 213 includes line graph 266 having a very large peak 281 and substantially zero values elsewhere. According to box 271 there are 17,245 ticks associated with peak 281. The source statement corresponding to peak 281 may be brought to display 214 by moving mouse pointer 250 to peak 281 and clicking the left mouse button thereon. In response, graphics highlighter 270 moves onto peak 281 while the source statements in the area of highlighter 270 will be displayed on display 214. Also, the source statement having the 17,245 ticks is accented by text highlighter 275.

However, in order to locate other "hot-spots," the scale of line graph 266 is changed so that other, i.e., low-level, peaks become visible. This is accomplished by a peak-elimination process, as discussed in detail below, which first resets the tick count to zero of the source statement with the highest tick count and then re-plots line graph 266. The peak-elimination process is initiated when the user moves mouse pointer 250 to display 213 and clicks the right mouse button. FIG. 2F illustrates newly drawn line graph 266 with new peak 282 that corresponds to a new highest tick count statement. The value of the new highest tick count is displayed in box 271, i.e., 158 tick counts. The user now brings the source statement with the highest count to display 214 by clicking the left mouse button on peak 282. FIG. 2G, which illustrates the results of this action, shows statement #163 accented by text highlighter 275 and graphics highlighter 270 moved to the region of peak 282.

Figure 2H:
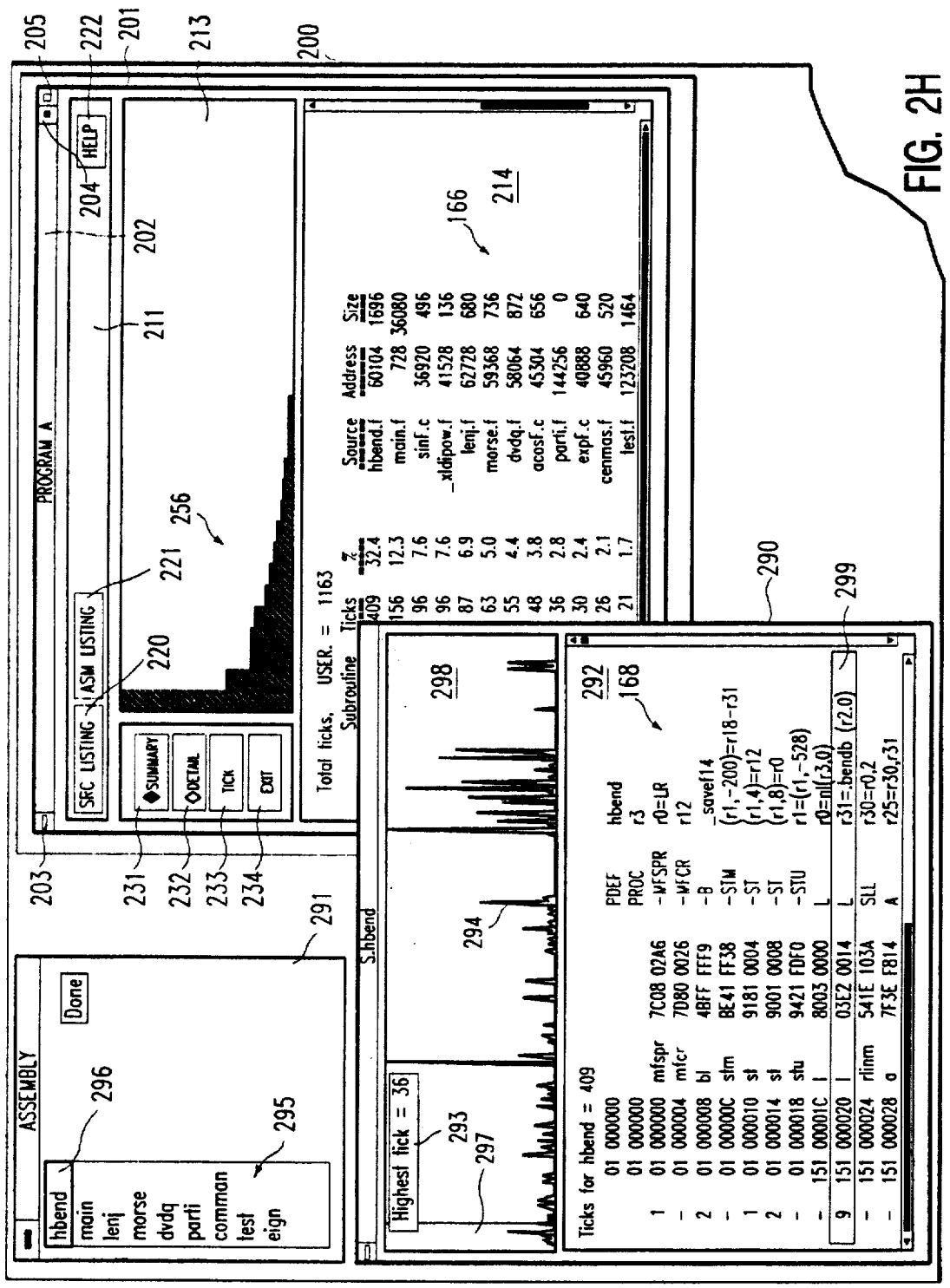
Figure 21:
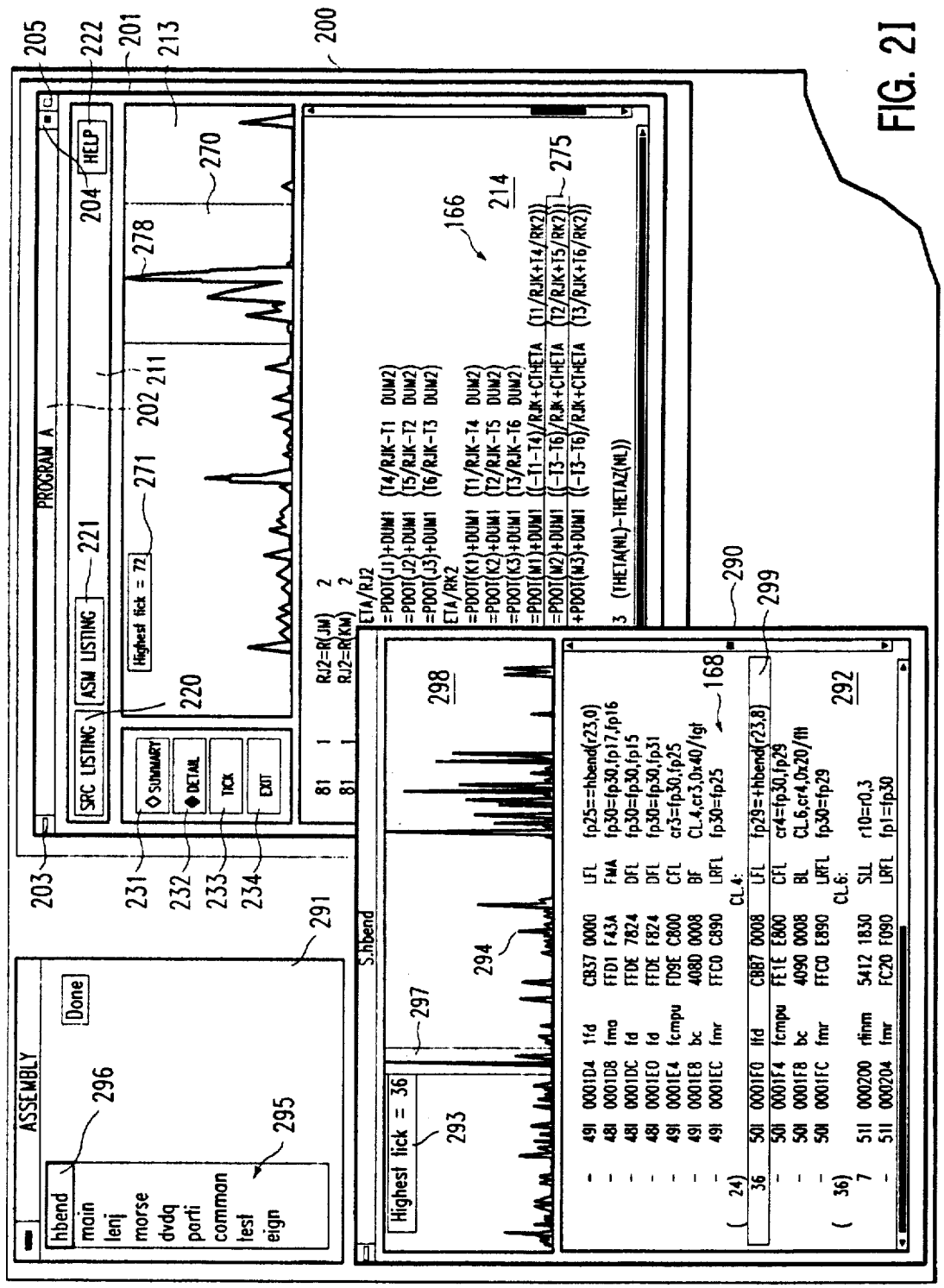

It is noted that when entering Detail-mode from Summary-mode, the default selection from menu bar 211 is SRC LISTING button 220. The user may, however, wish to view the assembly statements instead of the source statements. In this case, the user may, while in Summary-mode, select, through mouse manipulation, ASM LISTING button 221. In response, interface 170 (see FIG. 1) leaves the contents of main window 201 as is and brings to screen 200 two secondary windows 290 and 291 as shown in FIG. 2H.

Window 291 includes assembly file list 295 and highlighter 296; the latter accents the file name of the selected file in main window 201, if such a file was selected, or the first file in report 166 if no file was selected. Secondary window 290 includes graphics display 298 and text display 292. Graphics display 298 includes indicator box 293 that shows the highest tick count and line graph 294 that shows the relative location and size of the tick counts for all assembly statements in the assembly file. Moveable graphics highlighter 297 is also part of display 298. Annotated assembly listing 168 is displayed in text display 292. Within display 292, text highlighter 299 accents the assembly statement with the highest tick count. The user may manipulate graphics display 298 in the same way that display 213 is manipulated, e.g., highlighter 297 may be moved, and the highest peak may be set to zero for a re-plotting of line graph 294. Also, the assembly statements in listing 168 may be scrolled vertically and horizontally.

FIG. 2I shows main window 201 with annotated source listing 166 visible in display 214 and with graphics highlighter 270 located on peak 278. Also, text highlighter 275 accents the source statement that corresponds to peak 278, i.e., the source statement on line #92 with a tick count of 72. Also shown in FIG. 2I is secondary window 290 in which annotated assembly listing 168 is visible in display 292. Graphics display 298 shows line graph 294 and highlighter 297 located on the highest peak 296. Text highlighter 299 accents the corresponding assembly statement. Secondary window 291 shows a listing of the assembly files.

FIGS. 3–7 collectively depict flowcharts that describe the operation of text/graphic user interface 170. For ease of understanding, the reader should also simultaneously refer to FIGS. 2A–2I throughout the following discussion. Inasmuch as a specific implementation of this interface will vary depending upon the particular computer system on which the interface is executing and since the specific programming needed to form this implementation would be readily apparent to anyone skilled in the art from the information shown in these flowcharts, interface 170 will not be discussed at any lower level detail than that shown in FIGS. 3–7.

Figure 3:
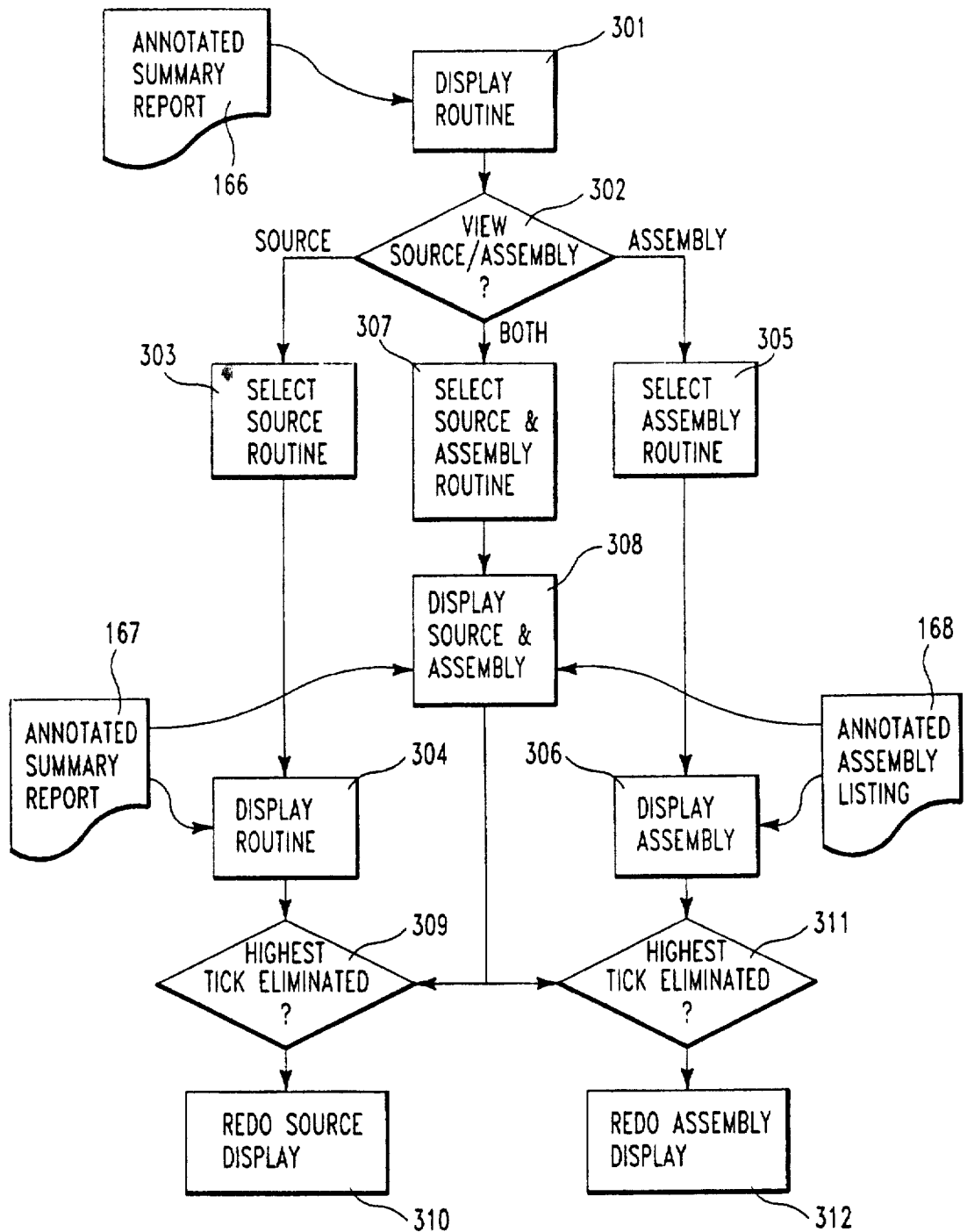
FIG. 3 is a generalized block diagram illustrating functions of the preferred embodiment of our invention.

FIG. 3, a high-level flowchart showing the general logic steps of interface 170, shows start-up step 301 in which a display routine accesses annotated summary report 166 and generates the Summary-mode display in main window 201. When the user enters the Detail-mode by selecting either DETAIL button 232, SRC button 220 and/or ASM LISTING button 221, decision step 302 is executed to determine which of the three paths, SOURCE, ASSEMBLY or BOTH to follow. If either the DETAIL button or SRC LISTING button is selected, flow will follow the SOURCE path to block 303. Alternatively, selecting the ASM LISTING button causes flow to follow the ASSEMBLY path to block 305. Selecting the ASM LISTING button and the SRC LISTING button causes flow to follow the BOTH path to block 307.

In step 303, a particular source routine is selected for display. The particular routine has already been executed through an execution analyzer, such as the "TPROF" profiling tool as previously discussed herein above. Through the use of this analyzer, annotated source listing 167 has been produced and is available for the selected source route. Therefore, block 304 is executed which, using annotated source listing 167, constructs a source display, such as shown in FIG. 2C. Execution then proceeds to decision block 309. Alternatively, in step 305, a particular assembly routine is selected for display. Again, as with the selected source routine, the selected assembly routine has been analyzed through the execution analyzer. The result of this analysis will reside within annotated assembly listing 168. Typically, though not mandatory, listing 167 and 168 will contain annotated listings of the source and assembly versions of the same routine(s). In any event, once block 305 has executed block 306, which utilizes annotated assembly listing 168 to construct an assembly display, such as shown in FIG. 2H, execution then proceeds to block 311. Now, through step 307, the corresponding source and assembly routines (i.e., the source and assembly versions of the same routine) are selected. Then, through step 308, both annotated source listing 167 and annotated assembly listing 168 are used to construct a source-assembly display. Thereafter, execution proceeds to step 309 or 311 (which both provide the same functions). As described above, the user, while in the Detail-mode, may eliminate the highest tick count by clicking the mouse with its pointer in graphics display 213 of main window 201 or in graphics display 298 of secondary window 290. Such user action, when detected in either step 309 or step 311, causes the displays to be re-drawn through step 310 or step 312. The re-drawn screens are illustratively depicted in FIGS. 2E–2G with respect to a source display.

Figure 4:
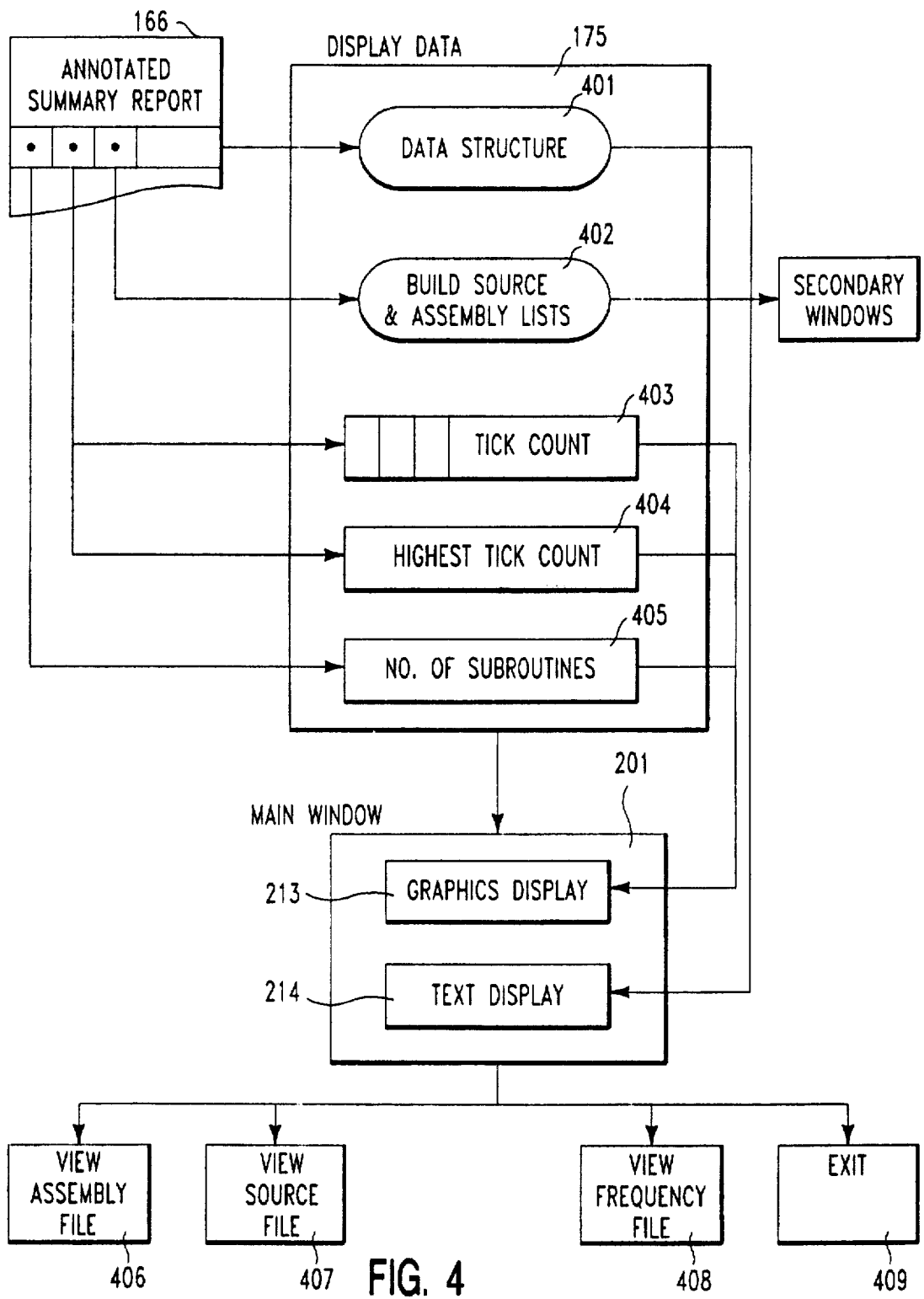
FIG. 4 is a functional block diagram illustrating in greater detail Summary-mode functions.

FIG. 4 shows a high-level flowchart depicting functions of interface 170 while in Summary-mode. As described above, these Summary-mode steps are also the default steps at initial setup. Here, annotated summary report 166 is first accessed to build a portion of display data 175 (see FIG. 1). This data is fabricated through successive execution of data-structure step 401, build-source-and-assembly-lists step 402, tick-count step 403, highest-tick-count step 404 and number-of-subroutines step 405. Specifically, through step 401, data from annotated summary report 166 is structured for display in the text display of main window 201 (see FIG. 2A). In step 402, source and assembly lists are built for display in secondary windows 280 and 291 in the Detail-mode. Steps 403–405, when executed, generate the graphical data (tick count, highest tick count and number of subroutines, respectively) needed to produce the items in graphics display 213. The appropriate line graphs or bar graphs are generated using tick counts from step 403 and a total number of subroutines provided by step 405. Through execution of step 404, the highest tick count is displayed in box 271.

The user enters the Detail-mode to view an assembly file, through execution of step 406, and/or to view a source file, through execution of step 407. These steps are performed when the Detail button and either the SRC LISTING button or the ASM LISTING button are selected. The user views frequency counts instead of tick counts, through execution of step 408 by selecting the TICK push button 233 (see, e.g., FIG. 2C); in which case, the label "TICK" on button 233 is changed to, for example, "FRQ" to indicate that frequency counts are being displayed. Finally, the user exits interface 170, through execution of step 409, by selecting EXIT button 234.

Figure 5:
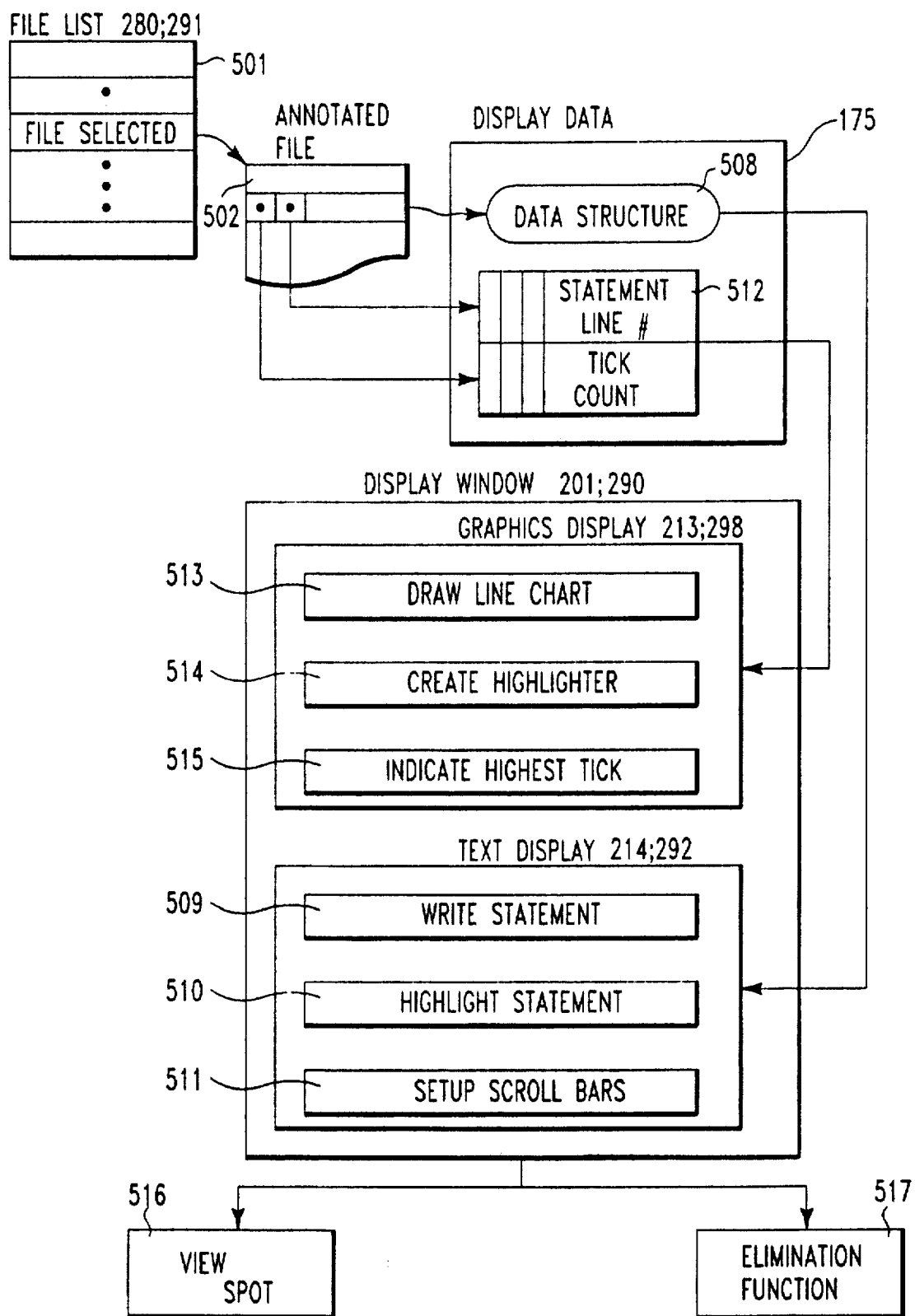
FIG. 5 is a functional block diagram illustrating in greater detail Detail-mode functions.

FIG. 5 shows a high-level flowchart for building windows 201, 280, 290 and 291 in the Detail-mode. For the Detail-mode displays appropriate display data 175 (see FIG. 1) is generated based on the selected file (the default file being the first file in summary report 166 as shown in text display 214). As shown in FIG. 5, step 501, when executed and based upon user input, selects the desired file to be displayed. Thereafter, through execution of step 502, the necessary annotated data for that file is fetched. Generally speaking, secondary windows 280 and 291 display the file lists and the selected files referred to in step 501. The annotated files used in step 502 are results 165 (as shown in FIG. 1). Through data-structure 508, the annotated data is structured for display in text display 214 and/or text display 292. This structuring involves writing the source and/or assembly statements through execution of step 509, highlighting the statements with the highest tick count through step 510, and setting, through execution of step 511, the scroll bars, e.g., bars 240 and 241, to their proper positions.

Step 512, when executed, fetches both statement line numbers and tick counts from the annotated files established in step 502. The statement line numbers and tick counts are used to generate graphics displays 213 and 298. Step 513, when executed, draws bar graph 256 and line graphs 266 and 294. Moveable highlighters 270 and 295 are generated in step 514. Indicator boxes 271 and 273 are generated through execution of step 515 for indicating the highest tick count. Step 516, when executed, provides a view-spot function, which is discussed in detail below, shown in flowchart form in FIG. 6. Step 517 represents elimination function 517, which is also discussed in detail below and shown in greater detail in flowchart form FIG. 7.

Figure 6:
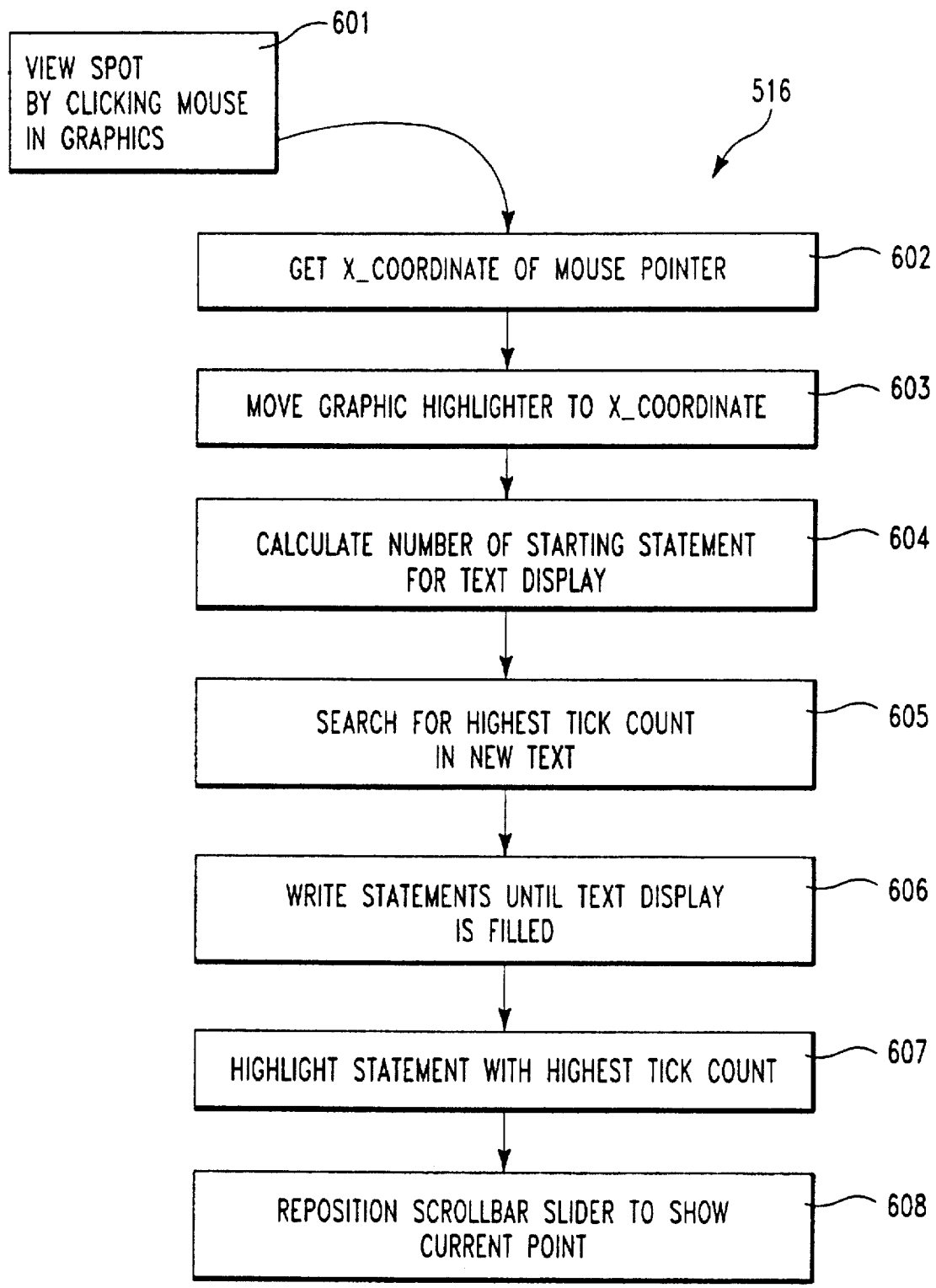
FIG. 6 is a functional block diagram illustrating in greater detail a function for user manipulation of data in the present invention.

The view-spot function, i.e., that provided by step 516 and shown in FIG. 6, is enabled by clicking mouse 130 at a desired spot in graphics displays 213 or 298. In response, interface 170 executes the following steps, in seriatim: step 602 which determines an X-coordinate of a current location of mouse pointer 250; step 603 which moves graphics highlighters 270 and 295 to the X-coordinate; step 604 which executes the statement number of the first statement to be displayed; step 605 which finds the highest displayed tick count; step 606 which writes statements onto text displays 214 and 292; step 607 which highlights the statement corresponding to the tick count found through step 605; and step 608 which appropriately re-positions the scroll bars.

Figure 7:
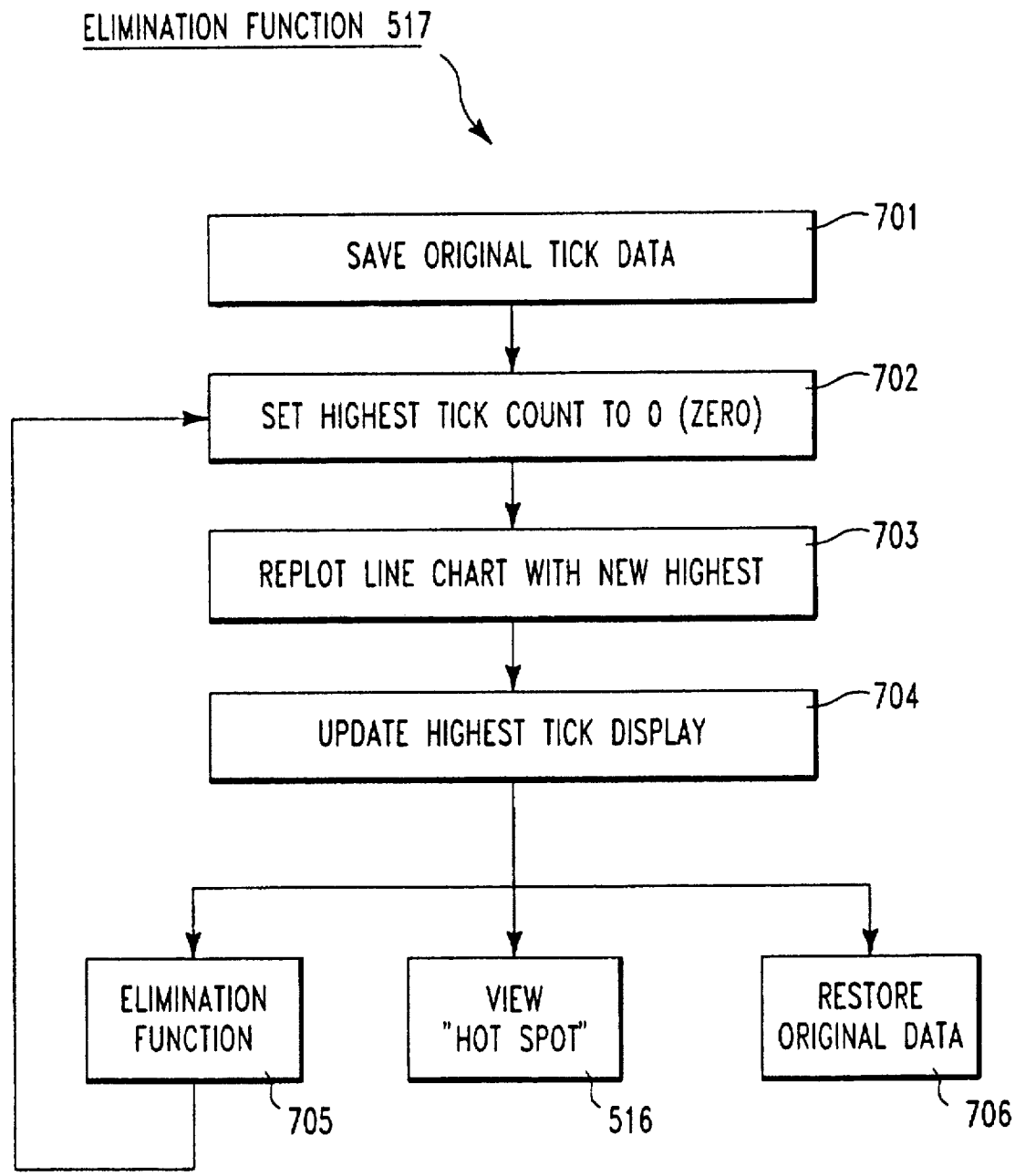
FIG. 7 is a functional block diagram illustrating in greater detail another function for user manipulation of data in the present invention.

As shown in FIG. 7, elimination function 517 is initiated whenever a user clicks the right mouse button in graphics displays 213 or 298. In response, interface 170 executes the following steps, in seriatim: step 701 which saves the original tick counts; step 702 which sets the highest tick count to zero; step 703 which re-plots line graphs 266 or 294 using the new highest tick count; and step 704 which updates indicator boxes 271 or 293 with the new highest tick count value.

At this point, the user may repeat the elimination function via step 705, in which case steps 702–704 are repeated to remove a successive "hot-spot". Also, the user may view a "hot-spot" or any other spot on the graphics displays 213 or 298 via step 516. Further, the user, through execution of step 706, may restore the original data by selecting DETAIL button 232. Each of these steps is invoked by appropriate mouse based commands.

By now, although our preferred embodiment which utilizes our inventive teachings has been shown and described in detail herein, those skilled in the art can readily devise many other varied embodiments that still incorporate these teachings.

What is claimed is:

1. A networkable user interface system for creating graphic and text displays of the results of a computer program profile analysis comprising:

a display monitor;

a display control means for enabling a user to input display commands; and a computer system, connected to said monitor and said display control means, comprising means for storing said analysis results and a user interface means, said user interface means comprising: an area display means for displaying on said monitor a text area, a graphics area and selection areas; and a data display means for accessing said results and writing selected portions of said results in said text area, drawing graphics of said results in said graphics area and displaying selection items responsive to a display command in said selection areas; said data display means being responsive to said display command for writing said selected portions in said text area and drawing said graphics of said selected portions in said graphics area, said results comprising a list of computer executable statements and corresponding execution counts for each of said statements so as to form a plurality of counts, and wherein said data display means writes selected ones of said statements and corresponding ones of said counts in said text area and draws a graph of the corresponding ones of said counts in said graphics area in response to said display command such that the graphics and text so displayed are synchronized with each other and highlights said ones of said statements written in said text area having a largest count within said corresponding ones of said plurality of said counts; and said graphics area comprises a highlighter means for accenting a portion of said graph corresponding to said ones of said statements in text area and wherein said graphics area further comprises graphics selector means responsive to said display commands for selecting a portion of said results to be written in said text area.

2. The system of claim 1 wherein said graphics area comprises an elimination selector means responsive to said display command for causing said data display means to set the highest one of said counts in said results to zero and re-draw said graphics of said results in said graphics area.

3. The system of claim 1 wherein said results comprise a list of subroutines having computer executable statements in each of said subroutines, and corresponding execution subroutine counts and execution statement counts.

4. The system of claim 1 wherein statements in said results comprise source statements and corresponding assembly statements with corresponding execution source counts and execution assembly counts.

5. The system of claim 1 wherein said results are generated by a remote central processing unit.

6. The system of claim 1 wherein said results are simultaneously generated by a remote central processing unit.

7. A networkable user interface method for creating graphic and text displays of the results of a computer program profile analysis comprising the steps of:

storing said results;

creating a monitor display having a text area, a graphics area and selection areas;

accessing said results to create a display data base;

writing selected portions of said results in said text area in accordance with said display data base;

drawing graphics of said results in said graphics area in accordance with said display data base;

displaying selection items in said selection areas;

displaying a highlighter means in said text area for accenting the statement with a highest count and a highlighter means in said graphics area for accenting that portion of said graph corresponding to said statements in said text area;

displaying a graphics selector means for selecting a portion of said results to be written in said text areas;

displaying a text selector means for selecting a portion of said results to be written in said text areas;

wherein said results comprise a list of computer executable statements and a corresponding execution count for each statement so as to form a plurality of counts, and said writing step comprises the step of writing selected ones of said statements and corresponding ones of said counts in said text area and highlighting said ones of said statements having a largest count, and said drawing step includes drawing a graph of the corresponding ones of said counts in said graphics area such that the graphics and text so displayed are synchronized with each other, and displaying a highlighter means for accenting that portion of said graph corresponding to said statements in text area.

8. The method of claim 7 wherein said results comprise a list of subroutines having computer executable statements in each of said subroutines, and corresponding execution subroutine counts and execution statement counts, and wherein said writing step comprises the step of writing selected portions of said statements and said counts in selected ones of said text areas.

9. The method of claim 8 wherein said statements in said results comprise source statements and corresponding assembly statements with corresponding execution source counts and execution assembly counts.

10. The method of claim 9 further comprising the steps of:
displaying an elimination selector means for setting the highest one of the corresponding one of said counts in said results to zero and re-drawing said graphics of said results.

11. The method of claim 7 wherein said results are generated by a remote central processing unit.

12. The method of claim 7 wherein said results are simultaneously generated by a remote central processing unit.

* * * * *

UNITED STATES PATENT AND TRADEMARK OFFICE
CERTIFICATE OF CORRECTION

PATENT NO. : 5,530,942
DATED : Jun. 25, 1996
INVENTOR(S) : Sheu-Fang M. Tzou, et al.

It is certified that error appears in the above-indentified patent and that said Letters Patent is hereby corrected as shown below:

Col. 4, line 16-17     Delete "co-pending".

line 19     Before "assigned" insert -- abandoned, continued as serial number 08/096,751, filed July 23, 1993, now U.S. Patent Number 5,355,487, issued October 11, 1994--.

Col. 10, line 53, claim 6     Delete "results" and after "said", insert --synchronized graphics and text--.

Col. 12, line 19, claim 12     Delete "results" and after "said", insert --synchronized graphics and text--.

Signed and Sealed this

Tenth Day of December, 1996

Attest:

BRUCE LEHMAN

Attesting Officer    Commissioner of Patents and Trademarks